US008309361B2

(12) United States Patent
Helberg et al.

(10) Patent No.: US 8,309,361 B2
(45) Date of Patent: Nov. 13, 2012

(54) METHOD FOR QUANTIFICATION OF ANALYTES IN A TITANIUM, TIN OR SILICON TETRACHLORIDE SAMPLE

(75) Inventors: Lisa Edith Helberg, Middletown, DE (US); Jane Ramsey Marsh, Smyrna, DE (US); Craig Steven Westphal, Landenberg, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 302 days.

(21) Appl. No.: 12/623,846

(22) Filed: Nov. 23, 2009

(65) Prior Publication Data

US 2010/0065736 A1 Mar. 18, 2010

Related U.S. Application Data

(63) Continuation of application No. 11/471,132, filed on Jun. 20, 2006, now abandoned.

(51) Int. Cl.
*H01J 49/26* (2006.01)
*C09K 3/00* (2006.01)

(52) U.S. Cl. ............. 436/73; 436/83; 436/84; 250/282; 250/286; 250/287

(58) Field of Classification Search .............. 436/73, 436/83, 84; 250/282, 286, 287
See application file for complete search history.

(56) References Cited

U.S. PATENT DOCUMENTS

| 2,600,881 | A | * | 6/1952 | Kay et al. ................... 203/29 |
| 3,950,494 | A | * | 4/1976 | Guenthner .................. 423/270 |
| 5,082,569 | A | | 1/1992 | Homeier et al. |
| 5,350,664 | A | | 9/1994 | Simons |
| 5,776,239 | A | | 7/1998 | Bruno et al. |
| 6,140,638 | A | | 10/2000 | Tanner et al. |
| 6,395,070 | B1 | * | 5/2002 | Bhadha et al. .............. 95/117 |

(Continued)

FOREIGN PATENT DOCUMENTS

JP 2002029747 * 1/2002

(Continued)

OTHER PUBLICATIONS

M. Horikawa et al., Method for producing aqueous titanium tetrachloride solution and apparatus therefor, Jan. 2001; machine translation of Written Description of JP 2002029747.*

(Continued)

*Primary Examiner* — In Suk Bullock
*Assistant Examiner* — Timothy G Kingan
(74) *Attorney, Agent, or Firm* — Gregory J. Feulner

(57) ABSTRACT

This disclosure relates to a method for detecting at least one analyte in a tetrachloride sample comprising titanium, tin or silicon tetrachloride; comprising,
(a) adding a mixture of water and acid, typically hydrochloric acid, to the sample under conditions effective for forming an aqueous solution of the sample;
(b) introducing the aqueous solution of the sample into an inductively coupled mass spectrometer having a cell selected from the group of a reactive cell and a collision cell or both and producing an analyte ion comprising an interfering species;
(c) contacting the analyte ion with a gas to produce a product which is substantially free from the interfering species; and
(d) detecting and measuring at least one signal from the analyte in the solution. This disclosure further relates to a method for making an aqueous titanium, tin or silicon tetrachloride sample suitable for analysis in using inductively coupled plasma mass spectroscopy.

15 Claims, 5 Drawing Sheets

U.S. PATENT DOCUMENTS

| | | |
|---|---|---|
| 6,444,189 B1 | 9/2002 | Wang et al. |
| 6,858,840 B2 | 2/2005 | Berkout |
| 6,875,618 B2 | 4/2005 | Bandura et al. |
| 7,230,232 B2 * | 6/2007 | Marriott ............... 250/281 |
| 7,273,588 B1 * | 9/2007 | Cowles et al. ........... 422/83 |
| 2005/0040342 A1 | 2/2005 | Kimura et al. |
| 2006/0045811 A1 | 3/2006 | Sugiyama |
| 2006/0047094 A1 * | 3/2006 | Cherkasov et al. ....... 526/172 |

FOREIGN PATENT DOCUMENTS

WO    WO2004/104518    12/2004

OTHER PUBLICATIONS

V.V. Korolev et al., Filter-type analyzer for continuous impurity monitoring for flowing titanium tetrachloride, Jan. 1975, Journal of Applied Spectroscopy, vol. 22, No. 1, pp. 116-118.*

R. Thomas, A Beginner's Guide to ICP-MS, 42 Spectroscopy, 2002, vol. 17:42-48.

Huang et. al., Study on the Method for the Determination of Impurities in Titanium Dioxide by ICP-MS, Depaetment of Applied Chemistry, 2005, vol. 21:423-425 English Abstract.

M. Odegard et. al., Preparation of Calibration Materials for Microanalysis of TI Minerals by Direct Fusion of Synthetic and Natural Materials: Experience With LA-ICP-MS Analysis of Some Important Minor and Trace Element in Ilmenite and Rutile, Journal of Analytical Chemistry, 2001, vol. 370:819-827.

Kuehn-Stoffers et. al., Journal Fuer Praktische Chemie/Chemiker-Zeitung, 1996, vol. 338:558-563 English Abstract.

Dieter Wildhagen et. al., Journal of Analytical Atomic Spectrometry, 1996, vol. 11:371-377.

A. Raith et. al., Journal of Analytical Chemistry, 1994, vol. 350:242-246.

Collision-Induced Dissociation, http://en.wikipedia.org/wiki/Collision-induced dissociation, Apr. 28, 2006.

J.R.S. Broughton et. al., Fourth Annual Reports on Analytical Atomic Spectroscopy Symposium, Analytical Atomic Spectroscopy, Proceedings of the Analytical Division of the Chemical Society, 1977, vol. 14:112-115.

Cherokee S. Hoaglund-Hyzer et. al., Mobility Labeling for Parallel CID of Ion Mixtures, Anal. Chem., 2000, vol. 72:2737-2740.

Bodo Hattendorf et. al., Inductively Coupled Plasma Mass Spectrometry With Dynamic Reaction Cell, pp. 1-6, (http://www.analytica.ethz.ch/Research/abstracts/DRC.html).

EPO Search Report.

XP002453942 Wang et al., Synthesis of Rutile ([Alpha]-TiO2) Nanocrystals With Controlled Size and Shape by Low-Temperature Hydrolysis: Effects of Solvent Composition Journal of Physical Chemistry B ACS USA, vol. 108, No. 39, Sep. 30, 2004, pp. 14789-14792.

XP001129355 Lee D-S et al, "Preparation of TiO2 SOL using TiCl4 as a Precursor" Journal of SOL-GEL Science and Technology, vol. 26, No. 2 Sep. 2002, pp. 121-136.

XP002453943 Shimizu et al., "Pack-Extraction Method Combined With Inductively Coupled Plasma Mass Spectroscopy to Monitor Metal Contaminants on Surfaces of Silicon Wafers" Semiconductor Science and Technology IOP Publishing UK, vol. 15, No. 7, Jul. 2000, p. 776-781.

European Search Report, Oct. 24, 2007.

* cited by examiner

METHOD FOR QUANTIFICATION OF ANALYTES IN A TITANIUM, TIN OR SILICON TETRACHLORIDE SAMPLE

BACKGROUND OF THE DISCLOSURE

1. Field of the Disclosure

The disclosure relates to a method for quantification of analytes in a sample comprising titanium, tin and/or silicon tetrachloride using inductively coupled plasma mass spectrometry (ICP-MS), particularly the quantification of inorganic analytes such as lead, arsenic and antimony. This disclosure also relates to a method for forming a stable aqueous solution of a sample comprising titanium, tin and/or silicon tetrachloride.

2. Description of the Related Art

Arsenic and antimony can be present in ores from which a titanium, tin or silicon tetrachloride composition useful as a starting material is derived. Most ores contain a variety of impurities that can end up in the compounds produced from them, such as the production of titanium tetrachloride from carbochlorination. Metals can also be useful in producing chlorides such as in the chlorination of tin to form tin tetrachloride. Tin is produced from tin-containing ore such as cassiterite which can contain arsenic and antimony.

It is useful to purify the titanium, tin or silicon tetrachloride composition to remove these and other impurities so that they do not appear in the products made from the titanium, tin or silicon tetrachloride. In particular, it can be especially useful to remove impurities from the titanium tetrachloride that may be used for making oxides, especially certain types of pigments (such as pearlescent titanium dioxide pigments); titanium metal; and catalysts. It is also useful to remove the impurities from tin tetrachloride that may be used in oxides, catalysts, or the production of organotin compounds. Silicon tetrachloride purity is useful in many applications such as in oxides such as fumed silica, ceramics or combined forms such as with titanium dioxide pigment.

In order to know the level of impurities in a sample or whether impurities have been effectively reduced, including to a trace amount or an amount on the order of parts per billion, special analytical techniques have been developed. One such analytical technique is inductively coupled plasma mass spectrometry (ICP-MS).

However, certain compositions such as titanium, tin and silicon tetrachloride pose challenges in the ICP-MS analysis. Neat titanium tetrachloride for example made by the chlorination of titanium-bearing ores, such as ilmenite or rutile, can be challenging to analyze using ICP-MS because it is known to be corrosive and water-sensitive. Tin and silicon tetrachloride are also known to be corrosive and water-sensitive.

One known method for analyzing for arsenic and antimony in titanium tetrachloride at trace levels is the hydride generation method using typically Graphite Furnace Atomic Absorption Spectroscopy (GFAA) but also Atomic Absorption Spectroscopy (AA) or Inductively Coupled Plasma—Atomic Emission Spectroscopy (ICP-AES). Inductively coupled plasma mass spectrometry (ICP-MS) can also be used. Usually for the hydride generation method the titanium tetrachloride is pretreated to avoid the corrosion and water sensitivity problems, and chloride interferences, by first converting it to titanium dioxide then digesting the titanium dioxide.

In the hydride generation method, elements of interest (As, Sb, Pb, Sn) form volatile hydrides at ambient temperatures under reducing conditions. The acid-borohydride reaction that is used most frequently for the hydride generation method is:

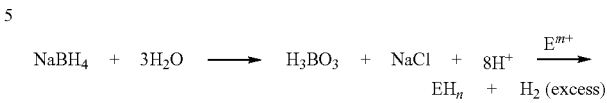

where E is the hydride-forming element and m may or may not equal n. In contrast to conventional solution nebulization, the hydride-forming elements enter the instrument (in the gaseous phase using a carrier gas such as $N_2$ or Ar). This serves to: 1) preconcentrate the analyte, 2) produce ions more efficiently, and 3) minimize potential spectral interferences due to matrix separation. This method is known for obtaining acceptable detection limits for solutions such as drinking water, soil extractions, or digestions of ore or other inorganic materials.

Several problems exist with the hydride-generation method, however. The hydride-generation method does not work for all elements of interest, especially including vanadium, iron, copper, niobium, and mercury, among others, thereby requiring a second instrumental method for their determination. Also, undesirable hydride gases such as $AsH_3$ can be produced in the hydride-generation method. The proper preparation steps and handling of the analyte gases must also be very rigorously followed to avoid losses that would underestimate results. Moreover, the additional pretreatment steps for converting $TiCl_4$ to titanium dioxide then digesting the titanium dioxide significantly increase the time required to complete the analysis and add additional opportunities for sample preparation error and contamination.

ICP-MS is a well known analytical technique for detecting elements in a liquid sample. In the ICP-MS technique, typically the liquid sample is first nebulized, then ionized in a plasma and the resulting ion beam is extracted under vacuum into a collision or reaction cell that is positioned before an analyzer quadrupole. A collision gas (such as helium) or a reaction gas (such as hydrogen) is then introduced into the cell which consists of a multipole (such as a quadrupole, hexapole or octapole), usually operated in the radio frequency (rf)-only mode. The rf-only field does not separate the masses like a traditional quadrupole, but instead has the effect of focusing the ions while they contact the gas for reactions or collisions. When in reaction mode, by a number of different reaction mechanisms, interfering ions are converted to either noninterfering species or another ion which has a different nominal mass than the ions of interest. When in collision mode, larger polyatomic ions will undergo more collisions than monoatomic ions of the same nominal mass, causing them to lose more energy. An energy filter at the cell exit prevents the polyatomic ions from reaching the detector and causing interferences. ICP-MS and the reaction-collision cell are described in U.S. Pat. Nos. 6,140,638 of Tanner et al. and 6,875,618 of Bandura et al.

There is a need for a method for analyzing impurities, especially in titanium tetrachloride compositions, that avoids the need for hydride generation and formation of undesirable hydride gases, a second instrumental method for analyzing impurities such as vanadium, iron, copper, niobium, and mercury that cannot be detected by the known hydride-generation method, losses from preparing analyte gases outside the analytical instrument, and high concentrations of interference producing ions.

Using ICP-MS for detecting impurities in titanium tetrachloride poses a problem because the liquid titanium tetrachloride must be formed into a solution that is safe to handle and compatible with the elemental analysis instrumentation. Tin and silicon tetrachloride pose similar challenges. U.S. Pat. No. 6,444,189 of Wang et al. discloses a method for preparing an aqueous solution by reacting the pure titanium tetrachloride with water. This technique cannot prevent the loss of the more volatile impurities in making up the solution. Also, with this method it is difficult to have tight control over the specific gravity of the final solution making reproducibility difficult. It is also more difficult to know the exact masses of the analytes of interest in the starting solution compared to the final composition. For ICP-MS analysis, sample analysis time will also be greatly increased if the samples are not similar in matrix, viscosity, and specific gravity, since matrix matching between calibration standards and samples is required when analyzing multiple solutions together.

A solution suitable for ICP analysis could also be obtained by reacting $TiCl_4$ with a suitable alcohol to form a titanate solution. However, the alcohol must be chosen appropriately for safety. This method has the same problems as the addition directly to water described in Wang et al., where control of the resulting concentration is difficult. The preparation method will also directly impact the types of metals that can be accurately quantified because of the different reaction chemistries. The titanate solution can be sensitive to precipitation when reacted with water which can make the preparation of the baseline standards problematic. U.S. Pat. No. 5,350,644 discloses making a stabilized titanium solution from a titanate solution. The stabilization adds yet another layer of complication in the sample preparation, plus another set of potential interferents.

Titanium tetrachloride can also be converted into an aqueous titanyl sulfate solution through precipitation with sulfuric acid and being re-dissolved in water. This procedure is not quantitative for all potential elements of interest. It also leaves residual chlorides present, has difficulty in reproducibility, can result in the formation of insoluble sulfates, and can impact sensitivity. The same is also true for conversion to a stabilized oxalic acid solution such as is discussed in U.S. Pat. No. 5,776,239. All these techniques add steps for analysis and pose problems associated with converting the titanium tetrachloride composition.

Methods that remove chloride interferences by converting the titanium tetrachloride into a solid compound such as titanium dioxide or titanyl sulfate add additional steps which can cause quantitative errors, increase the potential for measurement errors and add to the processing time.

SUMMARY OF THE DISCLOSURE

This disclosure provides a method for detecting at least one analyte in a sample comprising one or more of titanium tetrachloride, tin tetrachloride or silicon tetrachloride without hydride generation, losses from preparing analyte gases outside the analytical instrument, the production of a high concentration of interference producing ions and conversion of the tetrachloride into a solid.

A benefit of the process of this disclosure is that a plurality of impurities present in the sample can be detected in one sample run. Another benefit is that multiple samples can be prepared and run together with a high degree of sensitivity, such as part per billion, while allowing high instrument throughput.

This disclosure overcomes the instrument compatibility problems normally associated with titanium tetrachloride, tin tetrachloride, silicon tetrachloride or mixtures of two or more thereof.

This disclosure also overcomes the problems of plasma-based and solvent-based interferences which cause artificially high backgrounds, increase noise and imprecision which can have a negative impact on the method detection limits through the use of a collision/reaction cell-equipped ICP-MS.

Furthermore the method of this disclosure can be used to detect impurities, including vanadium, iron, copper, niobium, and mercury that are not detectable using the known hydride-generating method. The impurities, being the substances selected to be measured by ICP-MS constitute an analyte.

The disclosure relates to a method for detecting at least one analyte in a sample comprising one or more of titanium, tin or silicon tetrachloride using an inductively coupled mass spectrometer; comprising,
(a) contacting an aqueous stabilizing acid and the sample under conditions effective for forming an aqueous solution of the sample;
(b) introducing the aqueous solution of the sample into the inductively coupled mass spectrometer having a cell selected from the group of a reactive cell and a collision cell or both and producing an analyte ion comprising at least one interfering species;
(c) contacting the analyte ion with a gas to produce a product which is substantially free of the interfering species; and
(d) detecting and measuring at least one signal from the analyte in the aqueous solution of the sample.

In one embodiment, the disclosure relates to process wherein the stabilizing acid is hydrochloric acid and the sample comprises a major proportion of titanium tetrachloride and a minor proportion of at least one impurity, usually a plurality of impurities.

The stabilizing acid and the sample are usually chilled to a temperature below about 10° C., the lower limit usually being above the freezing point of titanium tetrachloride when the sample comprises a major proportion of titanium tetrachloride, but more typically to a temperature ranging from between about 0° C. and about 10° C. when the sample comprises a major proportion of titanium tetrachloride.

The conditions effective for stabilizing the sample are usually suitable for preventing a loss of volatile elements during an exothermic reaction of the sample and the aqueous stabilizing acid.

In one embodiment of the disclosure the gas is a reaction gas, typically hydrogen and/or a collision gas, typically helium.

More typically the sample comprises a major proportion of titanium tetrachloride and the stabilizing acid is hydrochloric acid, additionally, the aqueous solution of hydrochloric acid ranges from a concentration of about 3% to about 36 wt. % based on the weight of the aqueous hydrochloric acid solution. Yet more additionally, when the sample comprises a major proportion of titanium tetrachloride the solution of the sample has a titanium tetrachloride concentration ranging from about 5% to about 30% based on the total weight of the solution of the sample.

The impurities that can be detected by the process of this disclosure can be one or more of the following elements: arsenic, antimony, aluminum, silicon, calcium, vanadium, tin, iron, chromium, copper, cadmium, lead, magnesium, manganese, nickel, niobium, zirconium, zinc, barium, cobalt and mercury and one or more oxide, chloride, or hydride thereof.

In yet another embodiment of the disclosure the stabilizing acid is added to the sample.

In another aspect, the disclosure relates to a method for making an aqueous sample comprising one or more of titanium, tin or silicon tetrachloride suitable for analysis by inductively coupled plasma mass spectrometry, comprising:
chilling the sample;
chilling an aqueous solution of a stabilizing acid;
forming a solution of the sample and the acid by contacting the chilled sample with the chilled aqueous solution of the stabilizing acid at a rate sufficient for maintaining the solution temperature below about 10° C. while agitating the sample. Additionally, the stabilizing acid is added to the sample, additionally, the sample comprises a major proportion of titanium tetrachloride and the stabilizing acid comprises hydrochloric acid.

In one embodiment, the disclosure herein can be construed as excluding any element or process step that does not materially affect the basic and novel characteristics of the composition or process. Additionally, the disclosure can be construed as excluding any element or process step not specified herein.

DETAILED DESCRIPTION OF THE DISCLOSURE

Figure 1:
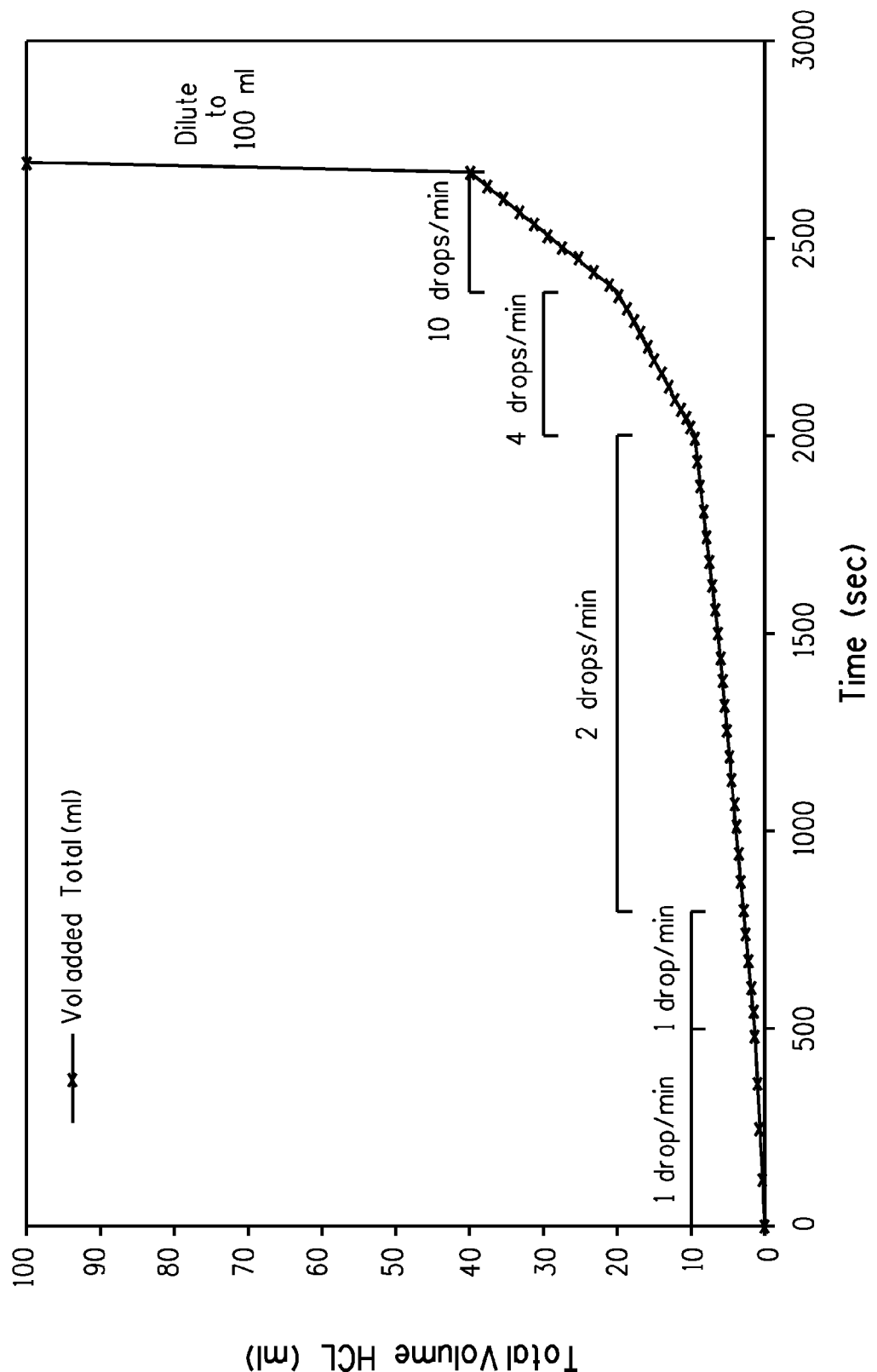
FIG. 1 is an estimated plot of time in seconds v. total volume of HCl (mL) added to stabilize a 10 mL titanium tetrachloride sample.

As used in this disclosure:

"Analyte" means any substance being identified and measured in an analysis and particularly inorganic substances including but not limited to Mg, Al, Si, Ca, V, Cr, Mn, Fe, Co, Ni, Zn, Cu, As, Zr, Nb, Cd, Sb, Ba, Pb and Sn.

"Analyte ions" means ions formed in the inductively coupled plasma when the sample is introduced in the ICP-MS, wherein the sample is completely disintegrated, atomized and ionized so that ions (usually atomic and usually singly charged) are formed.

"Collision cell" means a cell wherein the analyte ions collide with the collision gas and the polyatomic ions undergo more collisions (than monoatomic ions) that cause them to lose energy so that an energy filter at the cell exit prevents them from reaching the detector and causing interferences "Collision gas" means a gas or combination of gases that are used in the cell to collide non-reactively with the analyte ions.

"Inductively coupled plasma" or "ICP" means a source of atomization and ionization in which a plasma is established in an inert gas by the inductive coupling of radio frequency energy. The frequency of excitation force is in the MHz range.

"Mass spectrometer" means an instrument for producing ions and analyzing them according to their mass-to-charge ratio.

"m/z" means mass to charge value.

"Product ions" means the ions in the ion beam exiting the reaction-collision cell.

"Reaction cell" means a cell wherein analyte ions react with a gas forming product ions and species that have different mass to charge ratios than the analyte ions of interest.

"Reaction gas" means a gas or combination of gases that are used in the reaction-cell to form product ions and species that have different mass to charge ratios than the analyte ions of interest.

This disclosure relates to a method for detecting and measuring at least one analyte in a sample comprising at least one of titanium, tin or silicon tetrachloride, more particularly a major proportion of at least one of titanium, tin or silicon tetrachloride, by introducing an aqueous solution made from the sample into an inductively coupled plasma mass spectrometer which is connected to a cell which can be a reaction cell, a collision cell or both.

The analytes can be determined at parts per billion to percentage concentration levels typically on a neat basis such as a neat titanium tetrachloride basis.

The aqueous sample is introduced into an inductively coupled plasma mass spectrometer having a cell which can be a reaction or a collision cell or both. Conventional and well known techniques for using ICP-MS can be used for purposes of this disclosure including those described in U.S. Pat. No. 6,875,618.

The ICP-MS technique comprises a high temperature plasma, typically using an inert gas as the plasma gas, more typically argon, in which the sample is atomized and ionized, a vacuum interface which is designed to transport the plasma together with the analyte ions from atmospheric pressure to vacuum, an ion focusing optics and the cell for modification of the ion current and a quadrupole mass analyzing device.

The cell which can be a reaction cell or a collision cell or both can be a "Dynamic Reaction Cell" as described in R. Thomas "A Beginner's Guide to ICP-MS", 42 Spectroscopy 17(2), February 2002 also described in U.S. Pat. No. 6,140,638.

In one embodiment of the disclosure, an aqueous solution of the titanium tetrachloride sample can be formed by contacting chilled titanium tetrachloride with chilled aqueous hydrochloric acid, typically dilute aqueous hydrochloric acid. Both the temperature of the sample and the temperature of the aqueous hydrochloric acid can be brought to a temperature below about 10° C., typically between about 0° C. and about 10° C. Typically the aqueous hydrochloric acid and the sample are contacted when both are close to the same temperature, for example within about 1 to about 5° C. of each other, or at the same temperature, for convenience. A dilute aqueous solution of hydrochloric acid can be added, typically drop-wise, to the chilled titanium tetrachloride. The reaction of water and titanium tetrachloride is exothermic. In one embodiment of this disclosure after each HCl addition the mixture is cooled to below about 10° C., typically between about 0 and about 10° C. As the aqueous hydrochloric acid and the sample are contacted they can be mixed together by conventional means including by shaker plate, stirring bar, or stirring rod. Using a shaker plate is preferred since it reduces the chance for loss of solution and contamination from outside sources for trace elements. The hydrochloric acid can be gradually added to the titanium tetrachloride until a mixture of liquid and solid is obtained then the addition of hydrochloric acid can be increased with mixing until an aqueous solution is formed, typically the aqueous solution is solids-free.

This procedure can be used to provide solutions ranging from very low concentrations such as about 0.5% $TiCl_4$ in solution (w/w) up to the limits of solubility near about 55% $TiCl_4$ (w/w) based on the total weight of the titanium tetrachloride solution.

The higher the concentration of titanium tetrachloride in the resulting solution, the more difficult it is to maintain the stability of the resulting aqueous solution. However, with care the lower dilution ratios can be used when looking for very low concentration analytes. Typically, concentrations between about 5% and about 30% $TiCl_4$ (w/w), based on the total weight of the solution, can be used. As a good balance between the difficulty in producing the reproducibility of the solution and stability a 15% $TiCl_4$ (w/w), based on the total weight of the solution, can be preferred. A range of concentrations of HCl solution can also be used depending on the particular sample and analytes of interest. An aqueous solution ranging from about 3% HCl to concentrated HCl may be used, typically from about 3% to about 36% HCl, based on the total weight of the aqueous hydrochloric acid solution. Preferably, a concentration ranging from about 10% to about 30% HCl can be used even more preferably about a 20% aqueous HCl solution can be used.

When making up aqueous solutions with high titanium tetrachloride concentrations or when needing detection limits as low as the parts per billion level for the analytes of interest, to avoid titanium dioxide precipitation and/or loss of the analytes of interest by volatilization, one technique for accomplishing these objectives is to add, at temperatures below 10° C., typically from about 0 to about 10° C., the HCl at an initially low rate, typically from about one-twentieth of a milliliter to about one-half a milliliter of HCl over a time period determined by the starting mass of the titanium tetrachloride aliquot until the mixture becomes a thick liquid mixture containing porous solids (usually yellow porous solids) at which time the HCl addition rate can be increased because it takes less time to mix and cool because the reaction is not as exothermic or is no longer exothermic, and it is easier to mix because no additional solids form. Once a homogeneous solution is obtained the rest of the dilution volume of HCl can be added all at once. An estimated HCl addition rate that can be useful is shown in FIG. 1.

Diluting titanium tetrachloride with water in the presence of a stabilizing acid, results in the formation of titanium oxychloride which, for the purposes of this disclosure, can be referred to as aqueous solution of titanium tetrachloride.

The process for making the stable aqueous solution of titanium tetrachloride described hereinabove can be suitable for making a stable aqueous solution of tin tetrachloride or silicon tetrachloride or mixtures of two or more of titanium, tin or silicon tetrachloride. The temperature to which the acid and the tin or silicon tetrachloride are cooled may be significantly lower than 0° C. and as low as allowable for maintaining the compositions in a liquid state. Thus, useful temperatures would not be as low as the freezing points of the titanium tetrachloride, tin tetrachloride or silicon tetrachloride compositions.

The order of contacting the sample and the stabilizing acid can be important especially when the sample comprises a major proportion of titanium tetrachloride and the stabilizing acid is hydrochloric acid and trace quantities of analytes are to be detected. Adding the hydrochloric acid to the sample comprising a major proportion of titanium tetrachloride was found to facilitate detecting trace quantities, including as low as parts per billion quantities, of the analytes. The order of contacting was not found to matter when detecting higher quantities, including those on the order of parts per hundred quantities, of the analytes.

Typically, any aqueous acidic solution that can stabilize the sample can be used. Stabilizing acids that can be suitable are those that would facilitate formation of an aqueous mixture that can stay in a homogeneous solution for a suitable period of time and where the acids themselves would not create unremovable interferences or cause the formation of a precipitate or colloid. Aqueous hydrochloric acid is useful, but aqueous hydrofluoric acid may be used. Nitric acid and sulfuric acid were not found to be suitable.

For titanium tetrachloride or tin tetrachloride hydrochloric acid or hydrofluoric acid can be used or these acids can be used with a mixture of silicon tetrachloride and either or both of tin tetrachloride and titanium tetrachloride when the silicon tetrachloride is present in a minor proportion. When the major proportion of the composition comprises silicon tetrachloride, hydrofluoric acid is useful to avoid the formation of a precipitate which can happen when hydrochloric acid is used in a composition comprising a major proportion of silicon tetrachloride.

The aqueous solution is introduced into the ICP-MS to determine the impurities, typically inorganic impurities, in the sample. The aqueous solution can first be diluted as appropriate for operation of the instrument typically to about 1:100 (v/v) using an Internal Standard Solution (ISS) which is usually a 2% $HNO_3$ containing 100 ng/mL yttrium and rhodium, for a dilution factor (w/w) of about 78 to about 90, typically about 84 to about 88.

Typically the reaction gas for the ICP-MS cell is hydrogen but one or more of the following can also be used as reaction gases: ammonia, oxygen, or methane. Hydrogen gas can be used in a mixture with one or more of these other gases.

Typically the collision gas for the ICP-MS cell is helium but xenon can also be used. Helium can be used in a mixture with xenon.

A reaction gas or a collision gas can be used or a mixture of one or more reaction and collision gases can be used in the ICP-MS cell.

The reaction and collision cell located after the ion optics and before the multipole, typically quadrupole, mass filter is filled with the reaction or collision gas or both. As ions in the ion beam enter the cell they interact with the gas depending upon whether the gas is a reaction or collision gas. Usually there is one cell in the ICP-MS which can be operated in the reaction mode or collision mode or both.

If a reaction gas is used it can reduce, substantially eliminate or eliminate plasma-based interferences. When the plasma is argon, for example, a charge or proton transfer reaction is possible. The following is an example of charge transfer:

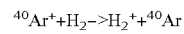

$$^{40}Ar^+ + H_2 \rightarrow H_2^+ + ^{40}Ar$$

For the charge transfer process, the neutral argon species is now prevented from passing through the mass filter, eliminating the interference at m/z 40, which is the main isotope for calcium so that the calcium content of the sample can be determined, minimizing or eliminating inaccuracy because of interferences from $^{40}Ar^+$.

The following is an example of proton transfer:

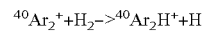

$$^{40}Ar_2^+ + H_2 \rightarrow ^{40}Ar_2H^+ + H$$

For the proton transfer process, the $^{40}Ar_2H^+$ ion is able to enter the multipole mass filter, but the interference is removed from m/z 80 which is the main isotope for selenium and transferred to m/z 81 so that the selenium can be determined minimizing or eliminating inaccuracy because of interferences from $^{40}Ar_2^+$.

Figure 2:
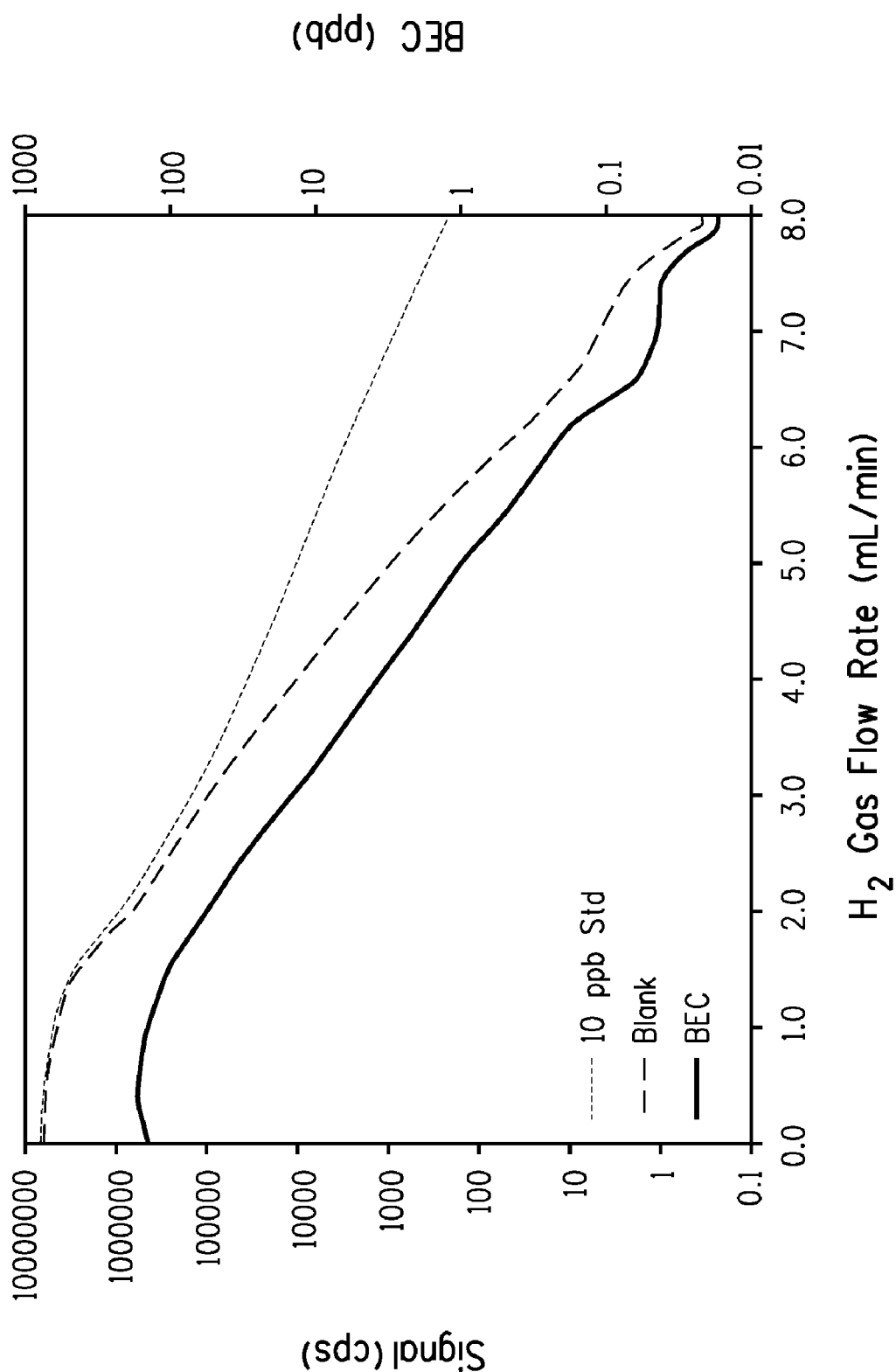
FIG. 2 is a plot of $H_2$ gas flow rate (mL/min) v. background equivalent concentration (BEC) (ppb) for the removal of $^{14}N^{2+}$, $^{12}C^{16}O^+$, and $^{13}C^{15}N^+$ on $^{28}Si^+$ at m/z 28 using hydrogen as a reaction gas.

The plot of FIG. 2 shows what happens in the proton transfer and charge transfer process with the removal of $^{14}N^{2+}$ and $^{12}C^{16}O^+$ and $^{13}C^{15}N^+$ on $^{28}Si^+$ at m/z 28 using hydrogen as a reaction gas. As shown in FIG. 2, addition of 5 mL/min of $H_2$ reduces the background equivalent concentration (BEC) of the interfering species on Si from 1 ppm (at 0 mL/min $H_2$) to less than 1 ppb, allowing for trace level determination. For $TiCl_4$ samples, addition of 5 mL/min $H_2$ reaction gas allows for the trace level determination of Si and Ca. While not being limited thereto, both elements can be determined simultaneously under one set of operating conditions, thereby reducing analysis time using the process of this disclosure.

The collision gas, typically helium, can be used to reduce, substantially eliminate or eliminate matrix-based interferences. When a collision gas is used, dissociation and energy transfer processes can occur. Most matrix-based interferences involve polyatomic ions (typically oxides, hydrides, carbides, and halides) that have the same nominal mass as the element of interest, such as $^{40}Ar^{16}O^+$ and $^{56}Fe^+$ at m/z 56. Energy transfer processes can occur when ions (both mono and polyatomic) undergo elastic collisions with an inert, unreactive gas, such as helium. Assuming constant gas density within the collision cell and a small kinetic energy distribution within the ion beam, the larger polyatomic ions will undergo more collisions as they pass through the cell than smaller monoatomic ions. This is useful when an interfering polyatomic ion and the analyte of interest have the same nominal mass, such as $^{40}Ar^{35}Cl^+$ and $^{75}As^+$. Since the ionic radius of the polyatomic ion is larger, it will undergo more elastic collisions with helium than the analyte of interest, losing more kinetic energy in the process. By applying an appropriate energy filter at the exit of the collision cell, the interfering polyatomic ion is prevented from exiting the collision cell and entering the multipole mass filter and being detected, while the analyte of interest passes through the cell onto the detector.

Dissociation is exemplified by the following reaction, when argon is the plasma gas:

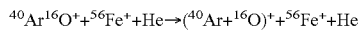

$$^{40}Ar^{16}O^+ + ^{56}Fe^+ + He \rightarrow (^{40}Ar + ^{16}O)^+ + ^{56}Fe^+ + He$$

where the polyatomic ion breaks apart through collisions with the collision gas, in this case helium, while the analyte of interest passes through the cell unaffected. This process is more significant for those polyatomic ions with lower bond strengths. Energy transfer processes therefore are more useful analytically, as they can be applied to any polyatomic interference.

Figure 3:
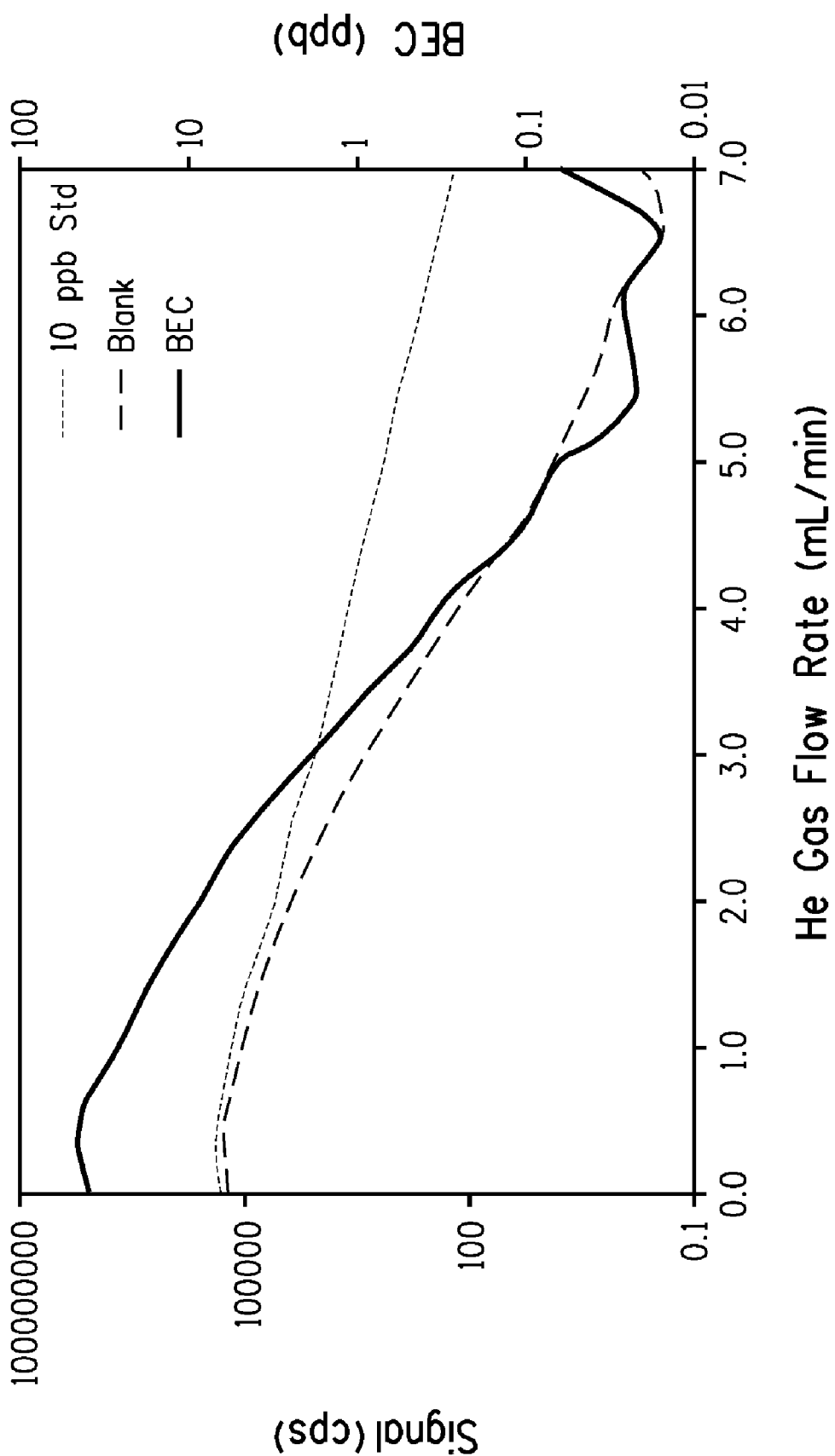
FIG. 3 is a plot of He gas flow rate (mL/Min.) v background equivalent concentration (BEC) (ppb) for the removal of $^{40}Ar^{35}Cl^+$ and $^{38}Ar^{37}Cl^+$ on $^{75}As^+$ at m/z 75 using helium as a collision gas.
Figure 4:
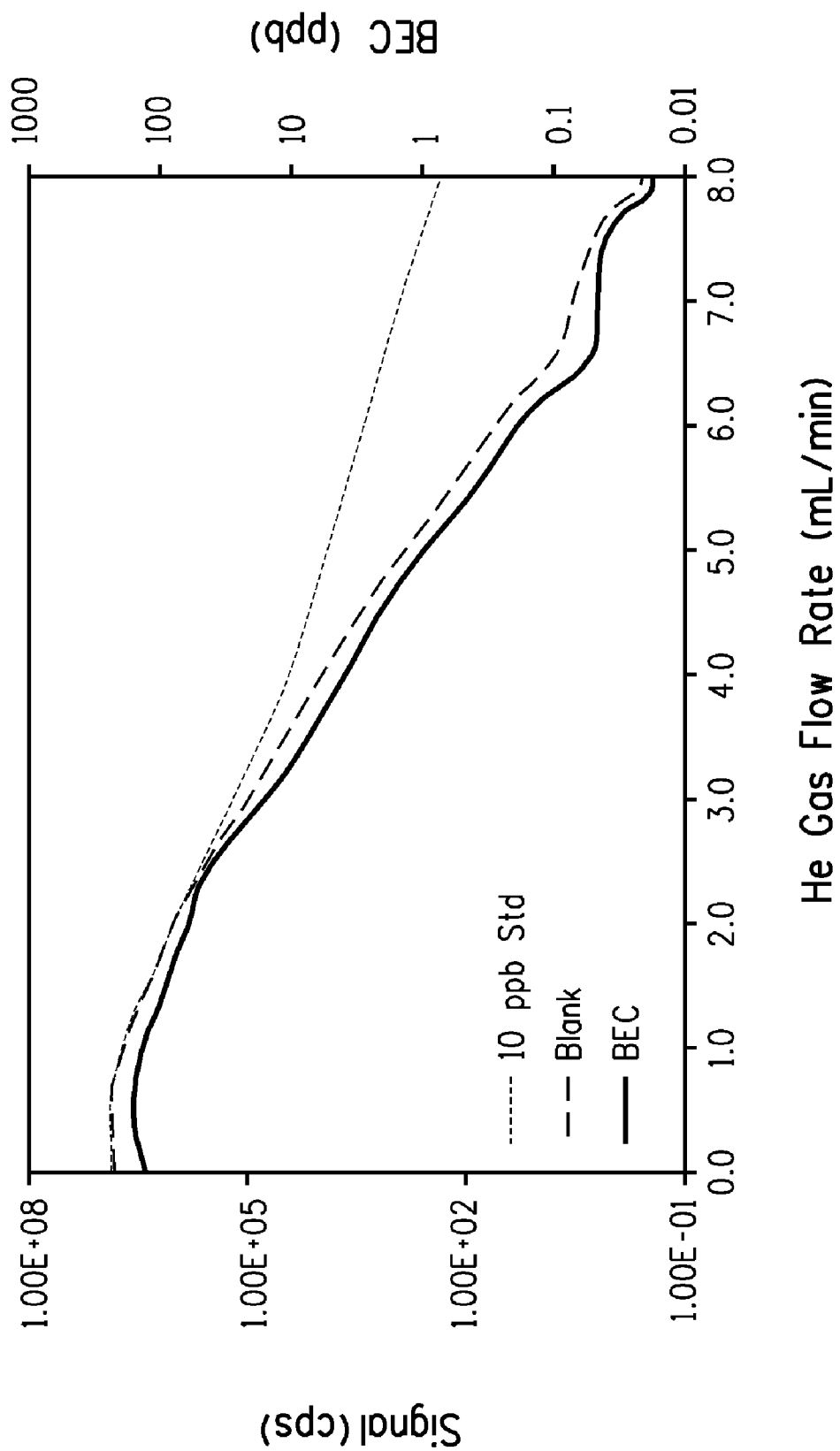
FIG. 4 is a plot of He gas flow rate (mL/Min.) v background equivalent concentration (BEC) (ppb) for the removal of $^{35}Cl^{16}O^+$ on $^{51}V^+$ at m/z 51.

The combination of both energy discrimination and dissociation processes is shown in FIGS. 3 and 4 for the removal of $^{40}Ar^{35}Cl^+$ and $^{38}Ar^{37}Cl^+$ on $^{75}As^+$ and $^{35}Cl^{16}O^+$ on $^{51}V^+$, respectively. For both analytes of interest, increasing the helium gas flow rate results in a reduction of background levels and BECs to less than 0.1 ppb. For $TiCl_4$ samples, addition of 5 mL/min of helium collision gas allows for the trace level determination of Mg, Al, V, Cr, Mn, Fe, Co, Ni, Zn, Cu, As, Zr, Nb, Cd, Sn, Sb, Ba, Hg, and Pb. A particularly useful advantage of the process of this disclosure, while not being limited thereto is that a plurality of elements up to all 19 elements can be determined simultaneously under one set of operating conditions.

The analyte ion comprising at least one interfering species is contacted with the gas in the cell to produce a product which is substantially free of interfering species, additionally the product is free of interfering species. When the product is substantially free of interfering species it can contain tolerable quantities of interfering species.

In general, for either a reaction or a collision gas, the ICP-MS process of this disclosure can be used to detect one or more of the elements shown in Table 2 herein below which can be found in a sample comprising titanium, tin or silicon tetrachloride, particularly titanium tetrachloride. The process of this disclosure can be used for detecting any other elements that can be detected by ICP-MS which might be present in the tetrachloride sample. These elements can be in the elemental form or in the form of compounds such as oxides, chlorides, hydrides, and the like and in either the ionic or non-ionic form.

The sample comprising one or more of titanium, tin or silicon that can be utilized in the process of this disclosure can be unpurified. For example, the sample can be in a form taken directly from a chlorination process without subsequent processing steps in which case it is likely to contain substantially all, if not all, the impurities of the ore. Alternatively, the composition from which the sample is taken can have been subjected to one or more treatments to reduce, remove, or add one or more different elements or compounds. Additionally, it can be purified to remove one or more impurities. Impurities mean elements or compounds other than the desired titanium, tin or silicon tetrachloride. Moreover, an impurity can be another tetrachloride including tin, titanium or silicon tetrachloride. For example, silicon or tin tetrachloride can be an impurity in a titanium tetrachloride composition. Similarly, titanium or tin tetrachloride can be an impurity in a silicon tetrachloride composition and titanium or silicon tetrachloride can be an impurity in a tin tetrachloride composition.

A composition for analysis in the process of this disclosure can be neat.

Usually the sample comprises a major proportion of titanium tetrachloride, tin tetrachloride, silicon tetrachloride or mixture thereof and a minor proportion of one or more impurities. A major proportion can mean greater than about 50 wt. %, typically greater than about 75 wt. %, more typically greater than about 98 wt. %, based on the total weight of the sample, and a minor proportion can mean less than 50 wt. %, typically less than 5 wt. %, more typically less than 2 wt. % and even more typically less than 10 part per million and as low as 1 part per billion based on the total weight of the sample.

Applicants specifically incorporate by reference the entire content of all cited references in this disclosure. Further, when an amount, concentration, or other value or parameter is given as either a range, more specific range, or a list of upper values and lower values, this is to be understood as specifically disclosing all ranges formed from any pair of any upper range limit or more specific value and any lower range limit or specific value, regardless of whether ranges are separately disclosed. Where a range of numerical values is recited herein, unless otherwise stated, the range is intended to include the endpoints thereof, and all integers and fractions within the range. It is not intended that the scope of the disclosure be limited to the specific values recited when defining a range.

EXAMPLES

The following Example illustrates the present disclosure. All parts, percentages and proportions are by weight unless otherwise indicated.

Example 1

Detection and Measurement of Inorganic Impurities in $TiCl_4$

A 10 mL (17.28 g) aliquot of a $TiCl_4$ sample was transferred into a 100 mL volumetric flask. The flask was placed into a tray filled with ice water. The tray was fitted with a lid that allows the top portion of the volumetric flask to be accessed while still holding the flask in place. The tray was placed on top of a shaker plate. In a separate ice bath, a 20% HCl solution was chilled to less than 10° C. After the $TiCl_4$ aliquot was chilled to below 10° C., one drop of 20% HCl was added to the volumetric flask. The resulting reaction is exothermic. The shaker plate was turned on low and allowed to swirl the solution until it was recooled to less than 10° C. Additions of the 20% HCl were continued in this fashion until a mixture of thick yellow liquid and porous yellow solids were obtained. At this point, the rate of addition of HCl solution was increased with continued mixing of the solution. After the volumetric flask was filled to 100 mL, a clear, solids free solution was obtained. The final weight of this solution was 114.86 g.

A low resolution ICP-MS equipped with an octopole collision cell was used to determine 21 inorganic impurities in the aqueous $TiCl_4$ solution that had been prepared. An aliquot of 0.1140 g of the sample was weighed out into a test tube. The sample was diluted to 10.1811 g using an Internal Standard Solution (ISS, 2% $HNO_3$ solution containing 100 ng/mL yttrium and rhodium), for a dilution factor of 89.31. The ICP-MS instrument was optimized in hydrogen ($H_2$) and helium (He) gas modes by monitoring the signal response of a standard solution containing 1 ng/mL Li, Co, Y, Ce, and Rh. The operating conditions used are listed in Table 1.

The $H_2$ gas flow rate was optimized (as shown in FIG. 2) by increasing the $H_2$ gas flow rate to minimize the signal at m/z 28, 40, 78, and 80 while maintaining sufficient sensitivity at m/z 59. Once optimized, $H_2$ mode can be used for the determination of Ca and Si. The optimal $H_2$ gas flow rate was 6.5 mL/min. The He gas flow rate was optimized (as shown in FIGS. 3 and 4) by increasing the He gas flow rate to minimize the signal at m/z 56, 75, and 156 while maintaining sufficient sensitivity at m/z 59. Once optimized, He mode can be used for the determination of Mg, Al, V, Cr, Mn, Fe, Co, Ni, Zn, Cu, As, Zr, Nb, Cd, Sn, Sb, Ba, Hg, and Pb. The optimal He gas flow rate was 5.5 mL/min.

A five-point standard addition curve (two-point for Hg) was generated for quantitative analysis. Six individual standard solutions were prepared as described below by adding known amounts of a Multielement Standard Solution ("MSS" which contains: 1 ppm: Mg, Al, Si, Ca, V, Cr, Mn, Fe, Co, Ni, Zn, Cu, As, Zr, Nb, Cd, Sb, Ba, and Pb; 10 ppm: Sn).

Standard 1 (Blank): ~0.1 g $TiCl_4$+9.9 g ISS
Standard 2 (10/100): ~0.1 g $TiCl_4$+9.8 g ISS+100 µl MSS
Standard 3 (20/200): ±0.1 g $TiCl_4$+9.7 g ISS+200 µl MSS
Standard 4 (30/300): ±0.1 g $TiCl_4$+9.6 g ISS+300 µl MSS
Standard 5 (50/500): ±0.1 g $TiCl_4$+9.4 g ISS+500 µl MSS
Standard 6 (Hg): ±0.1 g $TiCl_4$+9.85 g ISS+50 µl 1 ppm Hg standard

TABLE 1

Optimized ICP-MS Operating Conditions for $TiCl_4$ Analysis.

| ICP-MS PARAMETERS | | |
|---|---|---|
| ICP-MS instrument | Agilent 7500 cs | |
| RF power, W | 1600 | |
| Sampling depth, mm | 8 | |
| Nebulizer | PFA-100 | |
| Carrier gas flow rate, L/min | 1.0 | |
| Make-up gas flow rate, L/min | 0.25 | |
| Spray chamber type | Scott, double pass | |
| Spray chamber temperature, ° C. | 2 | |
| COLLISION GAS MODE | He | $H_2$ |
| ION LENSES | | |
| Gas flow rate, mL/min | 5.5 | 6.5 |
| Lens 1, V | 0 | 0 |
| Lens 2, V | −130 | −130 |
| Omega bias, V | −24 | −24 |
| Omega cs lens, V | 9.6 | 9.6 |
| Cell entrance, V | −26 | −26 |
| QP focus, V | −8 | −8 |
| Cell exit, V | −40 | −40 |
| OCTOPOLE PARAMETERS | | |
| Octopole RF | 190 | 190 |
| Octopole bias, V | −16 | −16 |
| QUADRUPOLE PARAMETERS | | |
| Atomic mass unit ("AMU") gain | 126 | 126 |
| AMU offset | 126 | 126 |
| Axis gain | 1 | 1 |
| Axis offset | 0 | 0 |
| QP bias, V | −12 | −14.5 |

Figure 5:
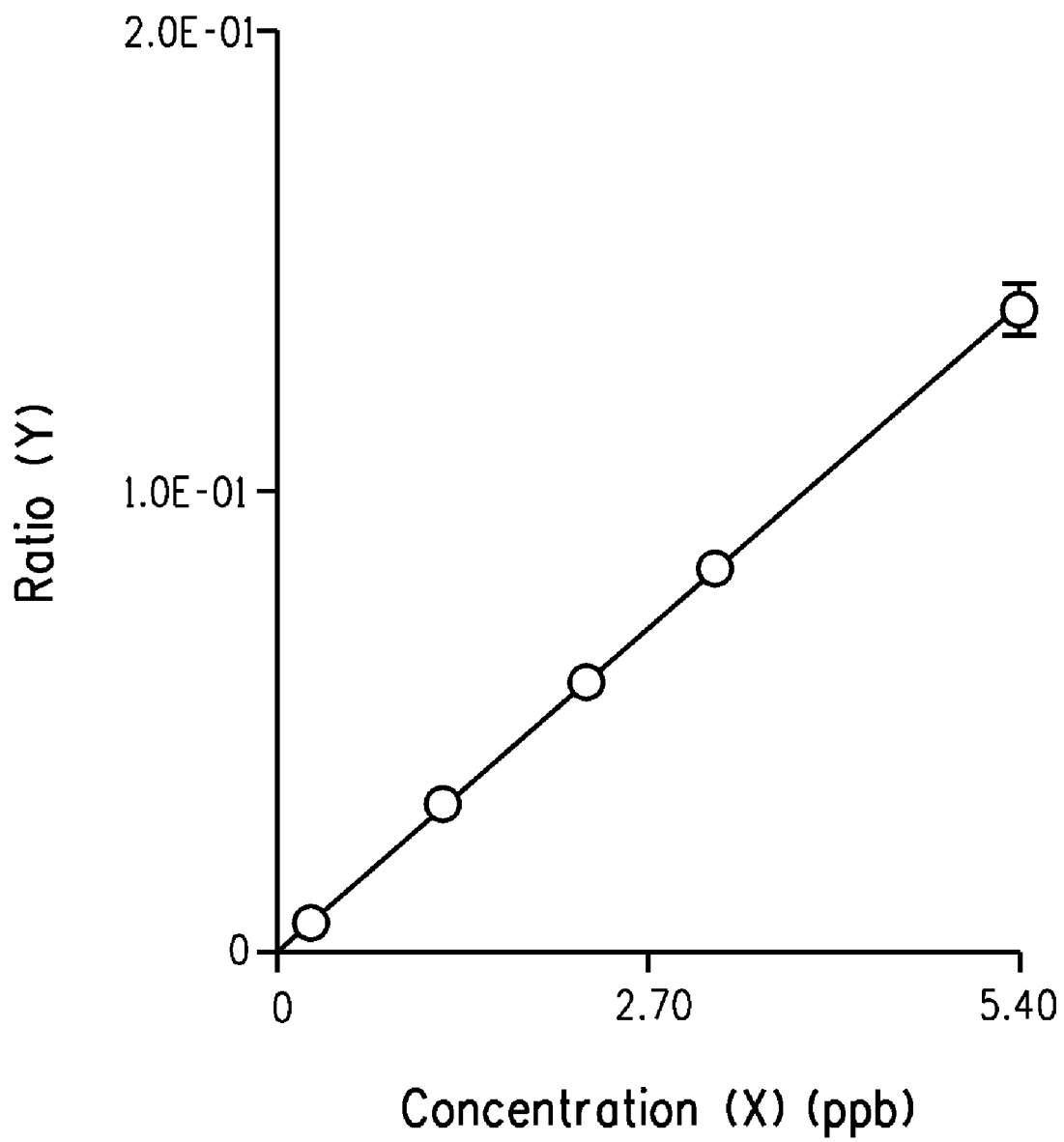
FIG. 5 is a calibration plot of concentration in ppb v. ratio of the signal of the analyte of interest to the signal of the internal standard.

Each standard was analyzed in both $H_2$ and He mode for the appropriate elements. The sample was then analyzed, and its concentration determined from the linear five-point calibration plot shown in FIG. 5.

Results of the analysis are given in Table 2.

TABLE 2

Measured concentration of inorganic impurities in aqueous $TiCl_4$ sample.

| As mg/kg | V mg/kg | Sn mg/kg | Sb mg/kg | Si mg/kg | Fe mg/kg | Al mg/kg | Cr mg/kg | Cu mg/kg | Cd mg/kg |
|---|---|---|---|---|---|---|---|---|---|
| 0.02 | 0.05 | 34.1 | 0.02 | 9.1 | 0.04 | <0.2 | <0.1 | <0.14 | <0.2 |

| Pb mg/kg | Mg mg/kg | Mn mg/kg | Ni mg/kg | Nb mg/kg | Zr mg/kg | Zn mg/kg | Ba mg/kg | Ca mg/kg | Co mg/kg | Hg mg/kg |
|---|---|---|---|---|---|---|---|---|---|---|
| <0.14 | <0.2 | <0.2 | <0.14 | <0.2 | <0.2 | <0.2 | <0.2 | <1.5 | <0.2 | <0.10 |

To calculate the concentrations of each of the analytes in the original $TiCl_4$ samples, the measured values on the aqueous solutions were multiplied by the sample solution weight, divided by the original weight of the $TiCl_4$.

The resulting values are given in Table 3.

TABLE 3

Calculated concentration of inorganic impurities in neat $TiCl_4$.

| As mg/kg | V mg/kg | Sn mg/kg | Sb mg/kg | Si mg/kg | Fe mg/kg | Al mg/kg | Cr mg/kg | Cu mg/kg | Cd mg/kg |
|---|---|---|---|---|---|---|---|---|---|
| 0.13 | 0.33 | 226.70 | 0.13 | 60.50 | 0.27 | <1.33 | <0.67 | <0.93 | <1.33 |

| Pb mg/kg | Mg mg/kg | Mn mg/kg | Ni mg/kg | Nb mg/kg | Zr mg/kg | Zn mg/kg | Ba mg/kg | Ca mg/kg | Co mg/kg | Hg mg/kg |
|---|---|---|---|---|---|---|---|---|---|---|
| <0.93 | <1.33 | <1.33 | <0.93 | <1.33 | <1.33 | <1.33 | <1.33 | <10 | <1.33 | <0.67 |

The description of illustrative and preferred embodiments of the present disclosure is not intended to limit the scope of the disclosure. Various modifications, alternative constructions and equivalents may be employed without departing from the true spirit and scope of the appended claims.

What is claimed is:

1. A method for detecting at least one non-titanium analyte in a sample comprising titanium tetrachloride using an inductively coupled mass plasma spectrometer wherein the method comprises performing sequentially the following steps,
    (a) providing a sample comprising titanium tetrachloride wherein the titanium tetrachloride concentration is equal to or greater than 50% based on the total weight of the solution of the sample,
    (b) adding a stabilizing and aqueous hydrochloric acid to the sample and introducing the sample into the inductively coupled plasma mass spectrometer having a cell selected from the group of a reactive cell and a collision cell or both and producing a non-titanium analyte ion comprising at least one interfering species;
    (c) contacting the non-titanium analyte ion with a gas to produce a product which is substantially free of the interfering species; and
    (d) detecting and measuring at least one signal from the non-titanium analyte in the aqueous solution of the sample.

2. The process of claim 1 wherein the sample is unpurified.

3. The process of claim 1 wherein the sample is purified.

4. The process of claim 1 wherein the temperature effective for forming an aqueous solution of the sample is below about 10° C.

5. The process of claim 1 wherein in which the sample comprises a major proportion of titanium tetrachloride the temperature effective for forming an aqueous solution of the sample is above the freezing point of the titanium tetrachloride sample but below about 10° C.

6. The process of claim 5 wherein the temperature effective for forming an aqueous solution of the sample is between about 0° C. and about 10° C.

7. The process of claim 1 wherein the conditions effective for stabilizing the sample prevent a loss of volatile elements during an exothermic reaction of the sample and the aqueous stabilizing acid.

8. The process of claim 1 wherein the gas is a reaction gas.

9. The process of claim 1 wherein the gas is hydrogen.

10. The process of claim 1 wherein the gas is a collision gas.

11. The process of claim 1 wherein the gas is helium.

12. The process of claim 1 wherein the concentration of hydrochloric acid in the aqueous solution of hydrochloric acid ranges from about 3% to about 36% based on the weight of the aqueous hydrochloric acid solution.

13. The process of claim 1 wherein the analyte is one or more of the following elements: arsenic, antimony, aluminum, silicon, calcium, vanadium, tin, iron, chromium, copper, cadmium, lead, magnesium, manganese, nickel, niobium, zirconium, zinc, barium, cobalt and mercury and an oxide, chloride, or hydride thereof.

14. A method for making an aqueous sample comprising titanium tetrachloride suitable for analysis by inductively coupled plasma mass spectrometry, comprising:
    providing a sample comprising titanium tetrachloride wherein the titanium tetrachloride concentration is equal to or greater than 50% based on the total weight of the solution of the sample;
    chilling the sample to form a chilled sample;
    chilling an aqueous hydrochloric acid to form a chilled aqueous solution;
    forming a solution by contacting the chilled sample with the chilled aqueous solution at a rate sufficient for maintaining the solution temperature below about 10° C. while agitating the sample.

15. The process of claim 14 wherein concentration of hydrochloric acid in the aqueous solution of hydrochloric acid ranges from about 3% to about 36% based on the weight of the aqueous hydrochloric acid solution.

* * * * *